United States Patent [19]

Ichihashi

[11] Patent Number: 4,844,122
[45] Date of Patent: Jul. 4, 1989

[54] ELECTROMAGNETIC VALVE WITH TWO OPPOSED VALVE SEATS

[75] Inventor: Kouji Ichihashi, Higashimatsuyama, Japan

[73] Assignee: Diesel Kiki Co., Ltd., Tokyo, Japan

[21] Appl. No.: 240,735

[22] Filed: Sep. 6, 1988

[30] Foreign Application Priority Data

Sep. 10, 1987 [JP] Japan .................................. 62-225243

[51] Int. Cl.[4] .......................................... F15B 13/044
[52] U.S. Cl. ............................ 137/625.65; 137/625.27
[58] Field of Search ........................ 137/625.27, 625.65

[56] References Cited

U.S. PATENT DOCUMENTS

| | | | |
|---|---|---|---|
| 3,661,183 | 5/1972 | Komaroff et al. | 137/625.65 |
| 3,732,893 | 5/1973 | Ziesche et al. | 137/625.65 |
| 4,596,273 | 6/1986 | Kiyoshima | 137/625.65 |
| 4,664,150 | 5/1987 | Steiger | 137/625.27 |
| 4,719,943 | 1/1988 | Perach | 137/625.65 |

FOREIGN PATENT DOCUMENTS

| | | |
|---|---|---|
| 49-10371 | 3/1974 | Japan . |
| 60-44671 | 3/1985 | Japan . |
| 60-53289 | 3/1985 | Japan . |
| 61-240297 | 8/1986 | Japan . |
| 2099959 | 12/1982 | United Kingdom .......... 137/625.65 |
| 2173550 | 5/1988 | United Kingdom . |

*Primary Examiner*—Gerald A. Michalsky

[57] ABSTRACT

An electromagnetic valve comprising a housing provided with a supply port, at least one control port and a discharge port, and a valve member accommodated movably in the housing. The housing is formed therein with first and second opposed valve seats extending perpendicularly to the axis of the valve member. The valve member has first and second abutment faces extending perpendicularly to the axis of the valve member. The first and second abutment faces are opposed respectively to the first and second valve seats. The valve member is movable between a position where the second abutment face is abutted against the second valve seat to intercept communication between the control port and the discharge port, and a position where the first abutment face is abutted against the first valve seat to intercept communication between the control port and the supply port. An area surrounded by an outer peripheral edge of the second abutment face is smaller than an area surrounded by an outer peripheral edge of the first abutment face.

5 Claims, 2 Drawing Sheets

ELECTROMAGNETIC VALVE WITH TWO OPPOSED VALVE SEATS

BACKGROUND OF THE INVENTION

The present invention relates to an electromagnetic valve provided with two opposed valve seats and three ports.

A two-seat electromagnetic valve is known, which is constructed basically in the following manner. That is, a housing is formed therein with a valve chamber defined between a pair of opposed faces. A pair of valve bores are formed respectively in the pair of opposed faces. The valve chamber is connected to an actuator through a control port. One of the pair of valve bores is connected to a pump through a supply port, while the other valve bore is connected to a tank through a discharge port. A valve member is accommodated in the valve chamber. When the valve member is moved away from a first valve seat formed about the one valve bore and is abutted against a second valve seat formed about the other valve bore, the control port is brought into communication with the supply port, but is intercepted from communication with the discharge port. On the other hand, when the valve member is abutted against the first valve seat, the control port is intercepted from communication with the supply port, but is brought into communication with the discharge port. Movement of the valve member is controlled by a coil spring arranged within the housing and a solenoid drive unit for generating force opposite to biasing force of the coil spring.

The known two-seat electromagnetic valves include ones of so-called ball type, flat type and cone type. The two-seat electromagnetic valve of ball type employs a valve member in the form of a ball, as disclosed in Japanese Patent Publication No. 49-10371 and Japanese Patent Application Laid-Open No. 60-53289. In the two-seat electromagnetic valve of flat type, each of a pair of valve seats is formed by a planar or flat face extending perpendicularly to an axis of a valve member and, likewise, each of a pair of abutment faces of the valve member capable of being in contact respectively with the valve seats is also formed by a planar or flat face extending perpendicularly to the axis of the valve member, as disclosed in Japanese Utility Model Application Laid-Open No. 61-140297 and the corresponding U.K. Pat. No. 2,173,550. The two-seat electromagnetic valve of cone type employs a valve member having a pair of abutment faces each of which is formed by a conical face, as disclosed in Japanese Patent Application Laid-Open No. 60-44671.

The above-described electromagnetic valves of ball type and cone type are widely used in pressure control on the basis of duty control. Specifically, when the solenoid drive unit is supplied with drive current in the form of pulses duty-controlled, a cross-sectional passage area between each of the pair of valve seats and a corresponding one of the pair of abutment faces of the valve member is determined correspondingly to the duty ratio of the drive current, thereby controlling hydraulic fluid pressure supplied to the actuator which is connected to the control port.

The two-seat electromagnetic valve of cone type disclosed in the above Japanese patents is in particular superior in response. This is because the opposed axial forces acting on the valve member due to application of the hydraulic fluid pressure to the valve member are canceled out with each other so that the valve member is moved under the biasing force of the coil spring and the force of the solenoid drive unit, substantially regardless of the pressure of the hydraulic fluid. Thus, the electromagnetic valve of cone type is suitable for use in relatively high-frequency duty control.

The pressure control is carried out on the basis of the duty control. Flow of the hydraulic fluid is restricted extremely, in the state in which the cross-sectional passage area between either one of the valve seats and a corresponding one of the abutment faces of the valve member is small. By this reason, the pressure at the control port do not vary in linear relation to displacement of the valve member and, accordingly, the pressure at the control port do not also vary in linear relation to the duty ratio.

It is required for the two-seat electromagnetic valve of cone type to displace the valve member relatively largely from the position where the valve member is seated on either one of the valve seats, in order to exceed the cross-sectional passage area which does not produce the above-mentioned linear relationship. The reason for this is that, since the abutment face of the valve member is inclined with respect to the axis of the valve member, variation of the cross-sectional passage area is small with respect to an amount of displacement of the valve member.

Thus, it is impossible for the two-seat electromagnetic valve of cone type to control the pressure on the basis of the duty control within a relatively wide range of from 0% to a certain lower value of the duty ratio and within a relatively wide range of from a certain high value to 100% of the duty ratio. In other words, a dynamic range defined between the certain lower and upper values, which is capable of controlling the pressure at the control port linearly, is narrow in width. By this reason, pressure variation at the control port cannot but be brought to a large value with respect to a given variation of the duty ratio. As a result, it has been difficult to carry out the pressure control with high accuracy or precision.

SUMMARY OF THE INVENTION

It is therefore an object of the invention to provide an electromagnetic valve with two opposed valve seats, which is suitable for use in relatively high-frequency duty control and which can carry out pressure control within a wide dynamic range of a duty ratio.

According to the invention, there is provided an electromagnetic valve comprising:
 (a) housing means including;
  (i) supply port means supplied with pressurized hydraulic fluid,
  (ii) discharge port means through which the hydraulic fluid is discharged,
  (iii) control port means to be connected to a subject to be controlled,
  (iv) a valve chamber connected to the control port means,
  (v) a straight extending guide bore having one end thereof opening to the valve chamber,
  (vi) a first valve seat surrounding a peripheral edge of an axial end of the guide bore on the side of the valve chamber, the first valve seat being formed by a planar face extending perpendicularly to an axis of the guide bore, (vii) a valve bore opening to the valve chamber, the valve bore being connected to the discharge port means, and (viii) a second valve seat surrounding an peripheral edge of an axial end of the valve bore on the side of the valve chamber, the second valve seat being formed by a planar face extending perpendicularly to the axis of the guide bore, the second valve seat facing toward the first valve seat through the valve chamber, wherein an area surrounded by an inner peripheral edge of the second valve seat is smaller than an area surrounded by an inner peripheral edge of the first valve seat, (b) a valve member reciprocatively movable within the guide bore in coaxial relation thereto, the valve member including;

(i) a land section having its outer periphery in contact with a peripheral wall surface of the guide bore in the housing means, (ii) a stem section having one axial end thereof connected to the land section in coaxial relation thereto, the stem section having an outer diameter smaller than a diameter of the guide bore, the stem section having an outer peripheral surface which cooperates with the peripheral wall surface of the guide bore to define therebetween an annular gap connected to the supply port means, and (iii) a valve section connected to the other axial end of the stem section in coaxial relation thereto, the valve section being arranged within the valve chamber, the valve section being provided at its opposite axial ends with a pair of first and second annular abutment faces which are planar and extend perpendicularly to an axis of the valve section, wherein the first abutment face is opposed to the first valve seat, wherein when the first abutment face is spaced away from the first valve seat, the supply port means is connected to the control port means through the annular gap and the valve chamber, wherein the second abutment face is opposed to the second valve seat, wherein when the second abutment face is spaced away from the second valve seat, the control port means is connected to the discharge port means, wherein an area surrounded by an outer peripheral edge of the first abutment face is larger than an area surrounded by an inner peripheral edge of the first valve seat and, likewise, an area surrounded by an outer peripheral edge of the second abutment face is larger than the area surrounded by the inner peripheral edge of the second valve seat, and wherein an area surrounded by an outer peripheral edge of the second abutment face is smaller than an area surrounded by an outer peripheral edge of the first abutment face;

(c) coil spring means accommodated in the housing means for biasing the valve member axially; and (d) solenoid drive means mounted to the housing means for applying force to the valve member which is opposite to biasing force of the coil spring means.

DETAILED DESCRIPTION

Figure 1:
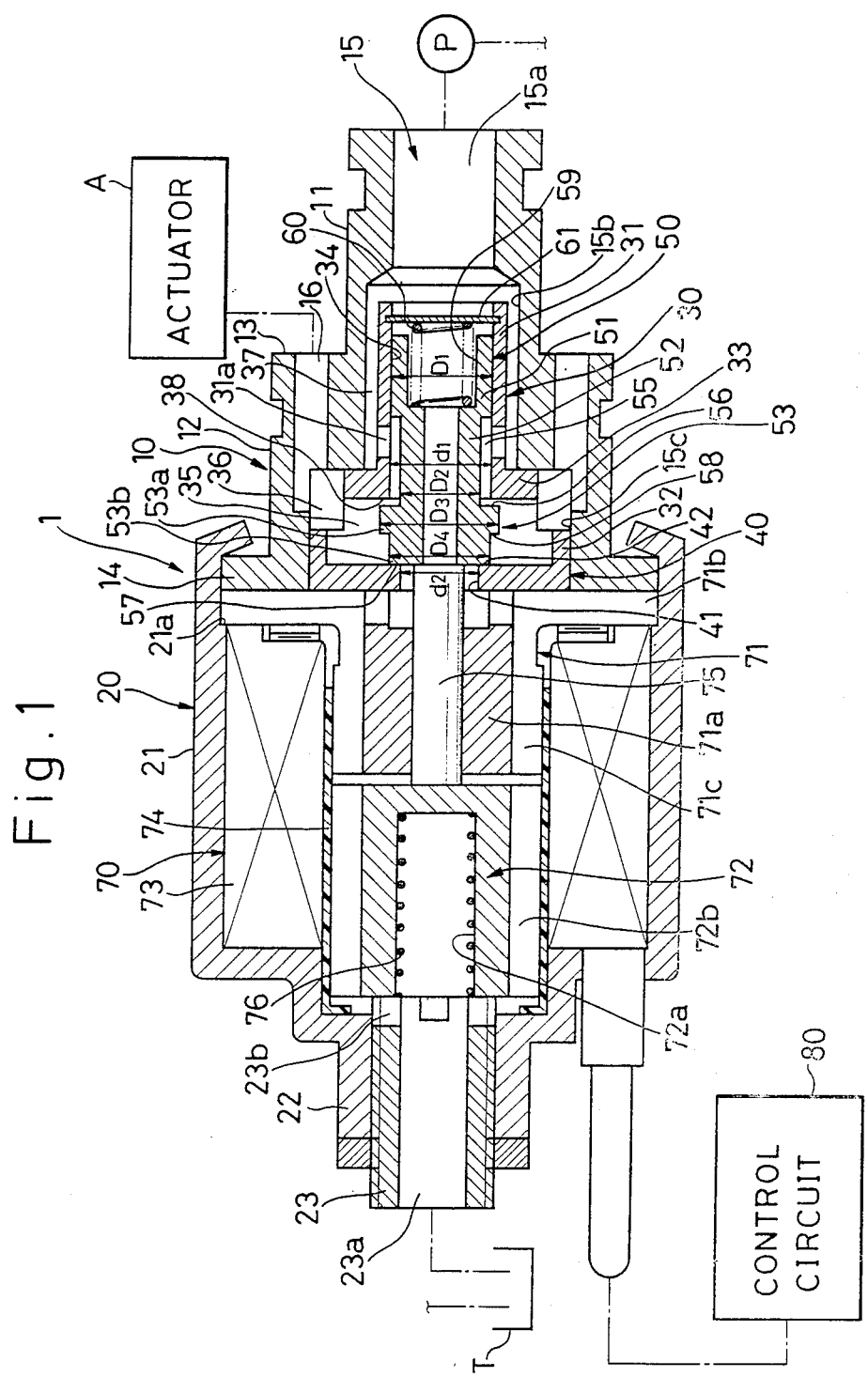
FIG. 1 is a longitudinal cross-sectional view of an electromagnetic valve with two opposed valve seats, according to an embodiment of the invention.

Referring to FIG. 1, there is shown an electromagnetic valve with two opposed valve seats, according to an embodiment of the invention. The valve comprises a housing 1 composed of a tubular body 10 and a tubular casing 20 which are connected in coaxial relation to each other.

The body 10 is composed of a right-hand small-diameter tubular section 11, a left-hand large-diameter tubular section 12, a shoulder 13 connecting the sections 11 and 12 to each other, and a flange 14 extending radially outwardly from a left-hand end of the large-diameter tubular section 12, as viewed in FIG. 1. The body 10 is formed therein with an axially extending stepped bore 15 increasing in diameter toward the left. The stepped bore 15 is composed of a first section 15a, a second section 15b and a third section 15c which are arranged in order from the right.

The small-diameter first section 15a located at the right-hand end of the stepped bore 15 serves as a supply port. The shoulder 13 of the body 10 is formed therein with a plurality of control ports 16 which extend parallel to the axis of the body 10 and which are spaced from each other circumferentially equidistantly. Each control port 16 has one axial end opening to an outer axial end face of the shoulder 13. The other axial end of the control port 16 communicates with the third section 15c at the left-hand end of the stepped bore 15.

A coupling (not shown) is mounted on the body 10. Through the coupling, the supply port 15a and the control ports 16 are connected respectively to a pump P and an actuator A such as a clutch driving cylinder or the like.

On the other hand, the casing 20 has a large-diameter section 21 and a small-diameter section 22. A right-hand end portion of the large-diameter section 21 is staked to the flange 14 of the body 10, thereby connecting the body 10 and the casing 20 to each other. A tubular member 23 is screwed into the small-diameter section 22 of the casing 20. A bore 23a formed along an axis of the tubular member 23 serves as a discharge port connected to a tank T.

A tubular guide cylinder 30 forming a part of the housing 1 is accommodated in a region extending from the second section 15b located intermediately of the stepped bore 15 in the body 10, to the third section 15c at the left-hand end of the stepped bore 15. A disc 40 forming a part of the housing 1 is accommodated in the left-hand end of the third section 15c in coaxial relation to the guide cylinder 30.

The guide cylinder 30 is composed of a right-hand small-diameter tubular section 31, a left-hand large-diameter tubular section 32, and a shoulder 33 connecting the sections 31 and 32 to each other. An internal space 34 surrounded by the small-diameter tubular section 31 serves as a valve bore or a guide bore for guiding a valve member 50 subsequently to be described. An internal space 35 defined by the large-diameter tubular section 32, the shoulder 33 and the disc 40 serves as a valve chamber. A plurality of circumferentially equidistantly spaced cut-outs 36 are formed at the connecting corner between the shoulder 33 and the large-diameter tubular section 32. The valve chamber 35 is connected to the control ports 16 through the cut-outs 36.

The small-diameter tubular section 31 of the guide cylinder 30 is accommodated in the second section 15b of the stepped bore 15 in the body 10. The small-diameter tubular section 31 has a peripheral wall whose outer diameter is smaller than an inner diameter of the second section 15b of the stepped bore 15. Thus, an annular gap 37 is defined between the small-diameter tubular section 31 and the second section 15b. Further, the peripheral wall of the small-diameter tubular section 31 is formed therein with a plurality of radial bores 31a in the vicinity of the shoulder 33.

The shoulder 33 of the guide cylinder 30 has an inward or left-hand axial end face which extends perpendicularly to the axis of the guide bore 34 and to an axis of the valve member 50 subsequently to be described. Of the left-hand axial end face, a radially inward annular section 38 extending along a peripheral edge of an axial end of the guide bore 34 on the side of the valve chamber 35 serves as a first valve seat.

On the other hand, the disc 40 is formed at its center with a valve bore 41. An axial end face of the disc 40 facing toward the first valve seat 38 extends perpendicularly to the axis of the valve member 50 subsequently to be described. Of the axial end face, a radially inward annular section 42 extending along a peripheral edge of the valve bore 41 serves as a second valve seat.

A diameter of the valve bore 41 in the disc 40, that is, a diameter $d_2$ of the inner peripheral edge of the second valve seat 42 is smaller than a diameter of the guide bore 34 in the guide cylinder 30, that is, a diameter $d_1$ of the inner peripheral edge of the first valve seat 38.

The valve member 50 is supported in the guide cylinder 30 for axial movement relative thereto. The valve member 50 is composed of a land section 51, a stem section 52 and a valve section 53, which are arranged in order from the right in coaxial relation to each other. The land section 51 and the stem section 52 of the valve member 50 are arranged within the guide bore 34 in the guide cylinder 30, while the valve section 53 of the valve member 50 is arranged within the valve chamber 35.

The land section 51 of the valve member 50 has an outer diameter $D_1$ substantially equal to the diameter $d_1$ of the guide bore 34, so that the land section 51 is in contact with the peripheral wall surface of the guide bore 34. Thus, the valve member 50 is movable axially, with the axis of the valve member 50 maintained in conformity with the axis of the guide bore 34.

The stem section 52 of the valve member 50 has an outer diameter $D_2$ smaller than the diameter $d_1$ of the guide bore 34, so that an annular gap 55 is formed between the stem section 52 and the peripheral wall surface of the guide bore 34. The annular gap 55 is connected to the supply port 15a through the aforesaid radial bores 31a in the guide cylinder 30 and the annular gap 37 defined between the guide cylinder 30 and the body 10.

The valve section 53 of the valve member 50 has a large-diameter portion 53a on the side of the first valve seat 38, and a small-diameter portion 53b on the side of the second valve seat 42. The opposite planar or flat axial end faces of the valve section 53 facing respectively toward the first and second valve seats 38 and 42 extend perpendicularly to the axis of the valve member 50. Radially outer annular sections 56 and 57 of the respective flat axial end faces of the valve section 53 serve respectively as first and second abutment faces which are capable of being abutted respectively against the first and second valve seats 38 and 42.

An outer diameter of the large-diameter portion 53a of the valve section 53, that is, an outer diameter $D_3$ of the first abutment face 56 is larger than the inner diameter $d_1$ of the first valve seat 31, thereby securing a contact area between the first valve seat 38 and the first abutment face 56. Likewise, an outer diameter of the small-diameter portion 53b of the valve section 53, that is, an outer diameter $D_4$ of the second abutment face 57 is larger than the inner diameter $d_2$ of the second valve seat 42, thereby securing a contact area between the second valve seat 42 and the second abutment face 57.

A step between the large-diameter portion 53a and the small-diameter portion 53b of the valve section 53 is formed into an annular pressure receiving face 58 extending perpendicularly to the axis of the valve member 50.

The valve member 50 is formed therein with an axially extending stepped bore 59. A coil spring 60 is accommodated under compression in a large-diameter section of the stepped bore 59. The coil spring 60 has one end thereof which is in engagement with the step of the stepped bore 59. The other end of the coil spring 60 is abutted against a closure plate 61 mounted to the small-diameter section 31 of the guide cylinder 30. The valve member 50 is biased toward the second valve seat 42 under the biasing force of the coil spring 60.

The valve member 50 is adapted to be controlled in movement by a solenoid drive unit 70 accommodated in the aforesaid casing 20. The solenoid drive unit 70 comprises a stator 71, an armature 72 and a coil 73.

The stator 71 of the solenoid drive unit 70 has a cylindrical section 71a and a radial flange 71b. The body 10 and the casing 20 are connected to each other in such a manner that an outer peripheral portion of the flange 71b of the stator 71 is clamped between the flange 14 of the body 10 and a step 21a formed in the inner peripheral surface of the large-diameter section 21 of the casing 20. Thus, the stator 71 is fixed within the housing 1. Further, the disc 40 and the large-diameter section 32 of the guide cylinder 30 are clamped between the flange 71b of the stator 71 and the axially inward end face of the shoulder 13 of the body 10. In this manner, these disc and guide cylinder 40 and 30 are fixed within the body 10 and the casing 20.

The armature 72 of the solenoid drive unit 70 is reciprocatively movable axially while being guided by a guide tube 74 formed of nonmagnetic material. The coil 73 is arranged about the outer peripheral surface of the guide tube 74. When the coil 73 is energized, the armature 72 is moved to the right as viewed in FIG. 1. Accommodated in the tubular section 71a of the stator 71 for axial movement is a rod 75 for transmitting force between the armature 72 and the valve member 50. The maximum moving stroke of the armature 72 between the stator 71 and the tubular member 23 is slightly larger than the stroke by which the valve section 53 of the valve member 50 moves between the first and second valve seats 38 and 42. The armature 72 is formed therein with an accommodating recess 72a. A relatively weak coil spring 76 is accommodated in the recess 72a for removing play of the armature 72.

The valve bore 41 in the disc 40 communicates with the discharge port 23a through a plurality of slits 71c formed in the outer periphery of the stator 71, a plurality of axial slits 72b formed in the outer periphery of the armature 72 and a plurality of cut-outs 23b formed in an axial end face of the tubular member 23 on the side of the armature 72.

The coil 73 is connected to a control circuit 80 which supplies drive current in the form of pulses. The pulses of the drive current are outputted at a relatively high frequency, for example, at 50 Hz. By modulation of the pulse width, the drive current is supplied whose duty ratio ranges from 0% to 100%.

In the two-seat electromagnetic valve constructed as above, when no drive current is supplied to the coil 73, or when the duty ratio of the drive current is 0%, the valve member 50 moves to the left under the biasing force of the coil spring 60 as shown in FIG. 1. The second abutment face 57 of the valve member 50 is abutted against the second valve seat 42, to thereby close the valve bore 41. The first abutment face 56 is spaced remotest from the first valve seat 38, to thereby open the guide bore 34. Accordingly, the control ports 16 are intercepted from communication with the discharge port 23a, but are brought into communication with the supply port 15a, so that the control ports 16 are supplied with the supply pressure $P_s$ from the pump P as it is. Force applied to the valve member 50 by the supply pressure $P_s$ in this state will be considered. Force $F_1$ in the same direction as the biasing force of the coil spring 60 acts on the valve member 50 due to a difference between the pressure receiving area formed by the right-hand end face of the valve section 53 of the valve member 50 and the pressure receiving are formed by the step face between the land section 51 and the stem section 52 of the valve member 50. The force $F_1$ can be expressed by the following equation:

$$F_1 = P_s(D_3^2 - D_1^2)\pi/4 \ldots \quad (1)$$

In the two-seat electromagnetic valve according to the illustrated embodiment, however, the pressure receiving face 58 of the valve 50 receives the aforesaid supply pressure $P_s$. Accordingly, the valve 50 receives force $F_2$ opposite in direction to the force $F_1$. The force $F_2$ can be expressed by the following equation:

$$F_2 = P_s(D_3^2 - D_4^2)\pi/4 \ldots \quad (2)$$

As a consequence, the total axial force $F_t$ acting on the valve member 50 due to the supply pressure $P_s$ can be expressed in the following equation, on the assumption that the left-hand direction is positive:

$$F_t = F_1 - F_2 = P_s(D_4^2 - D_1^2)\pi/4 \ldots \quad (3)$$

Since the valve member 50 receives the axial force due to the supply pressure $P_s$ and the biasing force $F_p$ of the coil spring 60, the second abutment face 57 is abutted against the second valve seat 42 with a set force $F_0$ which can be expressed by the following equation:

$$F_0 = F_p F_t \ldots \quad (4)$$

As will be clear from the above equation (3), if the diameter $D_4$ of the small-diameter section 53b of the valve member 53 is equal to the diameter $D_1$ of the land section 51, $F_t$ becomes equal to zero. Accordingly, the set force $F_0$ is made equal to $F_p$.

On the other hand, if the diameter $D_4$ of the small-diameter section 53b of the valve member 53 is smaller than the diameter $D_1$ of the land section 51, the force $F_t$ due to the supply pressure $P_s$ is brought to a negative value. That is, the force $F_t$ acts in such a direction as to be opposed to the biasing force $F_p$ of the coil spring 60. Accordingly, the set force $F_0$ is brought to a value smaller than the biasing force $F_p$ of the coil spring 60.

The diameter $D_4$ of the small-diameter section 53b of the valve member 53 can be reduced to a value at which the relation $F_p = F_t$ is satisfied, that is, to a value which satisfies the following equation:

$$D_4 = \sqrt{D_1^2 - 4F_p/\pi P_s}$$

In this case, the set force $F_0$ becomes zero.

It is preferable that the set force $F_0$ is brought to a value equal to or smaller than the biasing force $F_p$ of the coil spring 60, in order to widen the dynamic range of the duty ratio, subsequently to be described. Accordingly, it is preferable that the diameter $D_4$ of the small-diameter portion 53b is so set as to satisfy the following expression:

$$\sqrt{D_1^2 - 4F_p/\pi P_s} \leq D_4 \leq D_1$$

When the duty ratio of the drive current supplied to the coil 73 is 100%, the valve member 50 moves to the right under the exciting force of the coil 73 against the biasing force $F_p$ of the coil spring 60, so that the first abutment face 56 is seated on the first valve seat 38. Thus, the control ports 16 are intercepted from communication with the supply port 15a, but are brought into communication only with the discharge port 23a, so that the pressure at the control ports 16 is brought to substantially zero, that is, to the atmospheric pressure. In this state, the supply pressure $P_s$ is applied to the annular gap 55. Since, however, the respective pressure receiving areas at the opposite ends of the annular gap 55 are equal to each other, the axial forces acting on the valve member 50 due to the hydraulic supply pressure $P_s$ are canceled out with each other. Thus, a set force, with which the valve member 50 is abutted against the first valve seat 38, is determined only by the difference between the biasing force of the coil spring 60 and the force applied to the valve member 50 due to energization of the coil 73. It is preferable that the set force is brought to a small value or to zero, from the viewpoint of enlargement of the dynamic range of the duty ratio subsequently to be described.

As described above, the valve member 50 is not substantially influenced by such hydraulic fluid pressure as to disturb movement of the valve member 50 at any position. Accordingly, the valve member 50 is superior in response, like the two-seat electromagnetic valve of cone type. Thus, the duty control at the relatively high frequency can be carried out. This makes it possible to stabilize the pressure at the control ports 16.

The ratio $P_c/P_s$ between the pressure $P_c$ at the control ports 16 and the pressure $P_s$ at the supply port 15a is in linear relation to the duty ratio. As indicated by the solid line in FIG. 2, it is ideal that the dynamic range of the duty ratio capable of controlling the pressure $P_c$ at the control ports 16 linearly has a region of from 0% to 100%. The actual dynamic range, however, is narrower than the range of from 0% to 100%. The reason for this will be explained. If the duty ratio is approximate to 0%, the exciting force of the coil 73 is weaker than the aforesaid set force F₀, so that the valve member 50 cannot be displaced from the seated position where the second abutment face 57 is seated on the second valve seat 42. Further, if the duty ratio is approximate to 0%, the valve member 50 is not displaced from the seated position, because of a lag in response of the valve member 50. As the duty ratio is raised, the valve member 50 is displaced from the seated position. If an amount of this displacement is small and the cross-sectional passage area between the second valve seat 42 and the second abutment face 57 is small, the pressure $P_c$ at the control ports 16 does not fall in proportion to the amount of displacement of the valve member 50, because flow of the hydraulic fluid is extremely poor due to the orifice effect. Accordingly, the duty ratio and the pressure ratio $P_c/P_s$ are not in linear relation to each other, until the duty ratio varies from 0% to a predetermined value, i.e., to the lower limit of the dynamic range. The same discussion is applicable to the case of the vicinity of 100% of the duty ratio, so that the upper limit of the dynamic range of the duty ratio is determined.

Since the two-seat electromagnetic valve of the invention is superior in response similarly to the two-seat electromagnetic valve of cone type, the regions of the duty ratio, in which the duty ratio and the pressure ratio are not in linear relation to each other because of the above-mentioned lag in response, can be narrowed as compared with the two-seat electromagnetic valve of ball type. This makes it possible to widen the dynamic range of the duty ratio.

Figure 2:
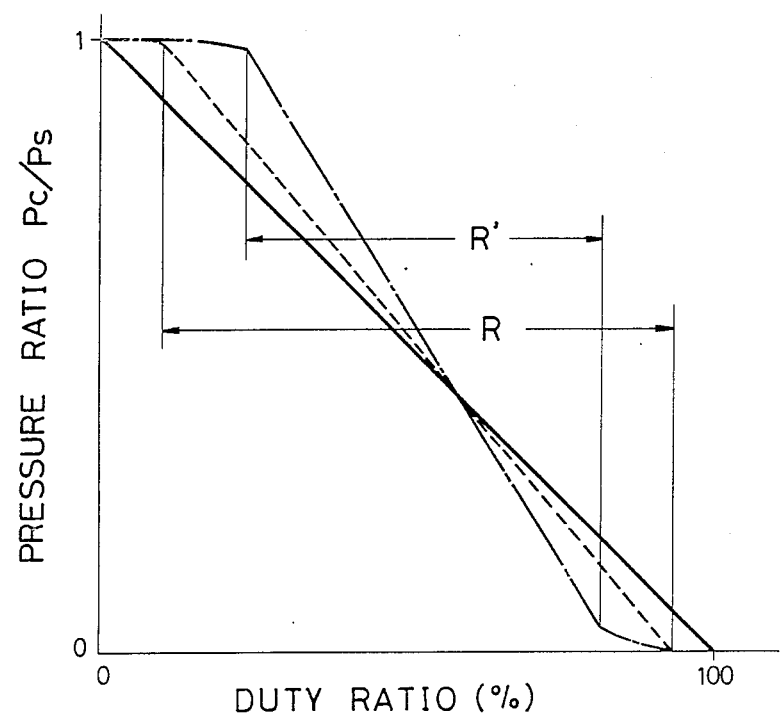
FIG. 2 is a graphical representation of the relationship between a duty ratio of drive current and pressure at control ports.

The relationship between the duty ratio and the pressure ratio $P_c/P_s$ in the two-seat electromagnetic valve of flat type according to the embodiment of the invention is indicated by the broken line in FIG. 2. The relationship indicated by the broken line has the following advantages as compared with that of the two-seat electromagnetic valve of cone type, indicated by the dot-and-dash line in FIG. 2. That is, the electromagnetic valve of the illustrated embodiment can be made wider in dynamic range R of the duty ratio capable of controlling the pressure ratio $P_c/P_s$ linearly, than that R' of the electromagnetic valve of cone type. The reason for this will be explained. Since the second valve seat 42 and the second abutment face 57 are both flat or planar and extend perpendicularly to the axis of the valve member 50, it is possible to increase the cross-sectional passage area between the second abutment face 57 and the second valve seat 42, which corresponds to an amount of displacement by which the valve member 50 is displaced axially from the position where the valve member 50 is seated on the second valve seat 42. By a relatively small amount of displacement of the valve member 50, the cross-sectional passage area exceeds the range in which it is impossible to obtain the linearity in the relationship between the duty ratio and the pressure ratio. In other words, the linear relationship between the duty ratio and the pressure ratio $P_c/P_s$ can be obtained from a relatively low value of the duty ratio, making it possible to lower the lower limit of the dynamic range. This discussion is applicable to the displacement of the valve member 50 from the seated position where the valve member 50 is seated on the first valve seat 38, making it possible to raise the upper limit of the dynamic range.

The dynamic range of the duty ratio can further be widened, if the set force at the time the valve member 50 is seated on the valve seat 38 or 40 is reduced to a low value or to zero, as described previously.

Figure 3:
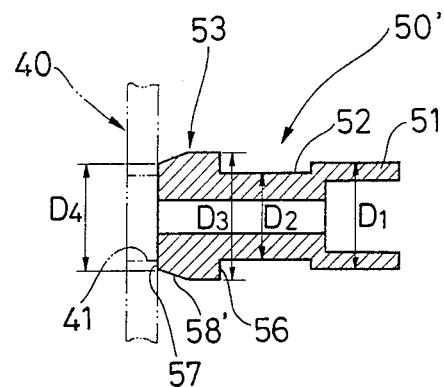
FIG. 3 is a cross-sectional view showing a modification of a valve member.

FIG. 3 shows a modification of the valve member 50 illustrated in FIG. 1. The modified valve member 50' is provided with a pressure receiving face 58' which is conical. The remaining construction of the valve member 50' is the same as the valve member 50 shown in FIG. 1. Accordingly, the same parts as those of the valve member 50 are designated by the same reference numerals, and the description of the same parts will therefore be omitted.

It is to be understood that the invention is not limited to the above-described specific embodiment, but various changes and modifications can be made to the invention. For instance, the arrangement may be such that when the solenoid drive unit is deenergized, the valve member is abutted against the first valve seat under the biasing force of the coil spring, to intercept communication between the control ports and the supply port. Further, although the guide bore, the valve bore and the valve member in the illustrated embodiment are all circular in cross-section, the valve section of the valve member may be non-circular in cross-section.

What is claimed is:
1. An electromagnetic valve comprising:
    a. housing means including;
        i. supply port means supplied with pressurized hydraulic fluid,
        ii. discharge port means through which the hydraulic fluid is discharged,
        iii. control port means to be connected to a subject to be controlled,
        iv. a valve chamber connected to said control port means,
        v. a straight extending guide bore having one end thereof opening to said valve chamber,
        vi. a first valve seat surrounding a peripheral edge of an axial end of said guide bore on the side of said valve chamber, said first valve seat being formed by a planar face extending perpendicularly to an axis of said guide bore,
        vii. a valve bore opening to said valve chamber, said valve bore being connected to said discharge port means, and
        viii. a second valve seat surrounding a peripheral edge of an axial end of said valve bore on the side of said valve chamber, said second valve set being formed by a planar face extending perpendicularly to the axis of said guide bore, said second valve seat facing toward said first valve seat through said valve chamber, wherein an area surrounded by an inner peripheral edge of said second valve seat is smaller than an area surrounded by an inner peripheral edge of said first valve seat;
    b. a valve member reciprocatively movable within said guide bore in coaxial relation thereto, said valve member including;
        i. A land section having its outer periphery in contact with a peripheral wall surface of said guide bore in said housing means,
        ii. a stem section having one axial end thereof connected to said land section in coaxial relation thereto, said stem section having an outer diameter smaller than a diameter of said guide bore, said stem section having an outer peripheral surface which cooperates with the peripheral wall surface of said guide bore to define therebetween an annular gap connected to said supply port means, and iii. A valve section connected to the other axial end of said stem section in coaxial relation thereto, said valve section being arranged within said valve chamber, said valve section being provided at its opposite axial ends with a pair of first and second annular abutment faces which are planar and extend perpendicularly to an axis of said valve section, wherein said first abutment face is opposed to said first valve seat, wherein when said first abutment face is spaced away from said first valve seat, said supply port means is connected to said control port means through said annular gap and said valve chamber, wherein said second abutment face is opposed to said second valve seat, wherein when said second abutment face is spaced away from said second valve seat, said control port means is connected to said discharge port means, wherein an area surrounded by an outer peripheral edge of said first abutment face is larger than an area surrounded by an inner peripheral edge of said first valve seat and, likewise, an area surrounded by an outer peripheral edge of said second abutment face is larger than said area surrounded by the inner peripheral edge of said second valve seat, and wherein the area surrounded by the outer peripheral edge of said second abutment face is smaller than the area surrounded by the outer peripheral edge of said first abutment face;

c. coil spring means accommodated in said housing means for biasing said valve member axially; and d. solenoid drive means mounted to said housing means for applying force to said valve member which is opposite to biasing force of said coil spring means;

wherein said coil spring means biases said valve member toward said second valve seat, wherein when said solenoid drive means is deenergized, said control port means is brought into communication with said supply port means, but is intercepted from communication with said discharge port means, wherein said valve member is circular in cross-section, wherein an outer diameter of said land section is $D_1$, an outer diameter of said second abutment face is $D_4$, the biasing force of said coil spring means at the time said valve member is abutted against said second valve set is $F_p$, the supply pressure is $P_s$, and the following relation exists therebetween:

$$\sqrt{D_1^2 - 4F_p/\pi P_s} \leq D_4 \leq D_1,$$

wherein said solenoid drive means is connected to control means which supplies duty-controlled drive current in the form of pulses, and wherein hydraulic fluid pressure at said control port means varies linearly in relation to a duty ratio of the drive current.

2. An electromagnetic valve according to claim 1, wherein a difference between the area surrounded by the outer peripheral edge of said first abutment face and the area surrounded by the outer peripheral edge of said second abutment face forms a pressure receiving face on said valve section of said valve member, said pressure receiving face extending perpendicularly to an axis of said valve member.

3. An electromagnetic valve according to claim 1, wherein a difference between the area surrounded by the outer peripheral edge of said first abutment face and the area surrounded by the outer peripheral edge of said second abutment face forms a pressure receiving face on said valve section of said valve member, said pressure receiving face being formed by a conical face.

4. An electromagnetic valve according to claim 1, wherein the outer diameter $D_4$ of said second abutment face is smaller than the outer diameter $D_1$ of said land section so that when said second abutment surface is seated on said second valve seat, force by the supply pressure is applied to said valve member in opposite direction to the biasing force of said coil spring to make set force applied to said valve member smaller than the biasing force of said coil spring.

5. An electromagnetic valve according to claim 4, wherein when said second abutment surface is seated on said second valve seat, the following equation is substantially satisfied;

$$D_4 = \sqrt{D_1^2 - 4F_p/\pi P_s}$$

so that the force by the supply pressure is substantially equal to the biasing force of said coil spring to make the set force substantially zero.

* * * * *